(12) United States Patent
Zakriti

(10) Patent No.: US 8,203,651 B2
(45) Date of Patent: Jun. 19, 2012

(54) VIDEO SIGNAL SYNCHRONIZATION

(75) Inventor: Abdelouahid Zakriti, Rabat (MA)

(73) Assignee: STMicroelectronics Maroc, Casablanca (MA)

( * ) Notice: Subject to any disclaimer, the term of this patent is extended or adjusted under 35 U.S.C. 154(b) by 790 days.

(21) Appl. No.: 12/266,973

(22) Filed: Nov. 7, 2008

(65) Prior Publication Data
US 2010/0118192 A1    May 13, 2010

(51) Int. Cl.
*H04N 5/08*    (2006.01)
*H04N 5/10*    (2006.01)

(52) U.S. Cl. .................. 348/525; 348/526; 348/529

(58) Field of Classification Search .............. 348/525, 348/526, 529–531, 194, 837; 386/201, 213, 386/217, 219; 345/213
See application file for complete search history.

(56) References Cited

U.S. PATENT DOCUMENTS

| | | | | |
|---|---|---|---|---|
| 3,530,238 A * | 9/1970 | Matarese | ................. | 348/530 |
| 4,291,335 A * | 9/1981 | Nakagawa et al. | ........... | 348/529 |
| 4,419,699 A * | 12/1983 | Christopher et al. | ........ | 386/216 |
| 4,600,944 A * | 7/1986 | Williams | .................. | 348/530 |
| 4,614,973 A * | 9/1986 | Sorenson | .................. | 348/525 |
| 4,694,340 A * | 9/1987 | Tanaka | ...................... | 348/529 |
| 5,031,041 A * | 7/1991 | Fling | ........................ | 348/529 |
| 5,053,869 A * | 10/1991 | Pletz-Kirsch | ............... | 348/531 |
| 5,144,433 A * | 9/1992 | Pletz-Kirsch et al. | ........ | 348/533 |
| 5,341,217 A * | 8/1994 | Florsek | ...................... | 348/529 |
| 5,835,154 A * | 11/1998 | Seitz | ........................ | 348/530 |
| 5,917,461 A * | 6/1999 | Sakami et al. | ................. | 345/29 |
| 6,226,044 B1 * | 5/2001 | Webb | ........................ | 348/526 |
| 6,678,892 B1 * | 1/2004 | Lavelle et al. | ................. | 725/75 |
| 2007/0182851 A1 * | 8/2007 | Chon et al. | .................... | 348/525 |

* cited by examiner

*Primary Examiner* — Victor Kostak
(74) *Attorney, Agent, or Firm* — Wolf, Greenfield & Sacks, P.C.

(57) ABSTRACT

The invention concerns receive circuitry for extracting horizontal and vertical synchronization signals from a digital synchronization signal associated with a video signal, the digital synchronization signal having a plurality of pulses, the receive circuitry including detection circuitry arranged to determine a first value indicative of the time delay between a timing edge of a first pulse and a timing edge of a second pulse of the digital synchronization signal; and a synchronization extraction block arranged to determine that one of the plurality of pulses is a vertical synchronization pulse based on a comparison between the first value and a reference value.

18 Claims, 3 Drawing Sheets

VIDEO SIGNAL SYNCHRONIZATION

BACKGROUND OF THE INVENTION

1. Field of the Invention

The present invention relates to receive circuitry and generation circuitry for respectively receiving and generating video synchronization signals, and to a method for extracting or generating video synchronization signals. In particular the present invention relates to circuitry or a method for receiving or generating digital video synchronization signals.

2. Discussion of the Related Art

Synchronization signals are used in association with video signals to provide timing information. In particular, video synchronization signals generally provide two types of timing information, a vertical synchronization signal, which indicates the start of each frame of an image, and a horizontal synchronization signal, which indicates, for each line in the video image, the start and end of the image portion of the line.

Both the vertical and horizontal synchronization signals generally comprise pulses to indicate the timing information. In analog video transmission systems, the vertical and horizontal synchronization signals are usually transmitted on separate lines.

A technical problem exists in transmitting both horizontal and vertical synchronization signals digitally on a same line.

SUMMARY OF THE INVENTION

Embodiments of the present invention aim at partially addressing one or more problems in the prior art.

According to one aspect of the present invention, there is provided receive circuitry for extracting horizontal and vertical synchronization signals from a digital synchronization signal associated with a video signal, the digital synchronization signal comprising a plurality of pulses, the receive circuitry comprising: detection circuitry arranged to determine a first value indicative of the time delay between a timing edge of a first pulse and a timing edge of a second pulse of the digital synchronization signal; and a synchronization extraction block arranged to determine that one of the plurality of pulses is a vertical synchronization pulse based on a comparison between the first value and a reference value.

According to one embodiment of the present invention, the synchronization extraction block is arranged to determine that one of the plurality of pulses is a vertical synchronization pulse if the first value is less than the reference value. The first pulse is for example a horizontal synchronization pulse corresponding to a blank line of video, the second pulse is a reference pulse, and the one of the plurality of pulses is the next pulse after the second pulse.

According to another embodiment of the present invention, the receive circuitry further comprises a register arranged to store the reference value, and a control block arranged to update the reference value based on the determined time delay between two consecutive pulses, wherein neither of the consecutive pulses is a reference pulse.

According to another aspect of the present invention, there is provided a display comprising the above receive circuitry, for example adapted to be mounted in a vehicle.

According to another aspect of the present invention, there is provided a method for extracting horizontal and vertical synchronization signals from a digital synchronization signal associated with a video signal, the digital synchronization signal comprising a plurality of pulses, the method comprising: determining a first value indicating the time spacing between a timing edge of a first pulse and a timing edge of a second pulse of the digital synchronization signal; and determining that one of the plurality of pulses is a vertical synchronization pulse based on a comparison between the first value and a reference value.

According to yet another aspect of the present invention, there is provided generation circuitry for generating a digital synchronization signal comprising horizontal and vertical synchronization pulses and reference pulses, the generation circuitry comprising a circuit arranged to insert, for each of the vertical synchronization pulses, a reference pulse having a timing edge spaced in time from a timing edge of one of the horizontal synchronization pulses by a determined time delay. The circuit is for example arranged to generate the reference pulses by delaying each vertical synchronization pulse by the determined time delay.

According to another aspect of the present invention, there is provided a video camera comprising the above generation circuitry or receive circuitry.

According to another aspect of the present invention, there is provided a proximity detector for a vehicle comprising the above video camera.

According to another aspect of the present invention, there is provided a method of generating a digital synchronization signal comprising horizontal and vertical synchronization pulses and reference pulses, the method comprising inserting, for each of the vertical synchronization pulses, a reference pulse having a timing edge spaced in time from a timing edge of one of the horizontal synchronization pulses by a determined time delay.

According to another aspect of the present invention, there is provided in a video processing system, a synchronization signal comprising horizontal synchronization pulses, vertical synchronization pulses, and for each vertical synchronization pulse, a reference pulse located a determined time period after a horizontal synchronization pulse. The horizontal synchronization pulses, vertical synchronization pulses and reference pulses for example each have the same amplitude.

DETAILED DESCRIPTION

Figure 1:
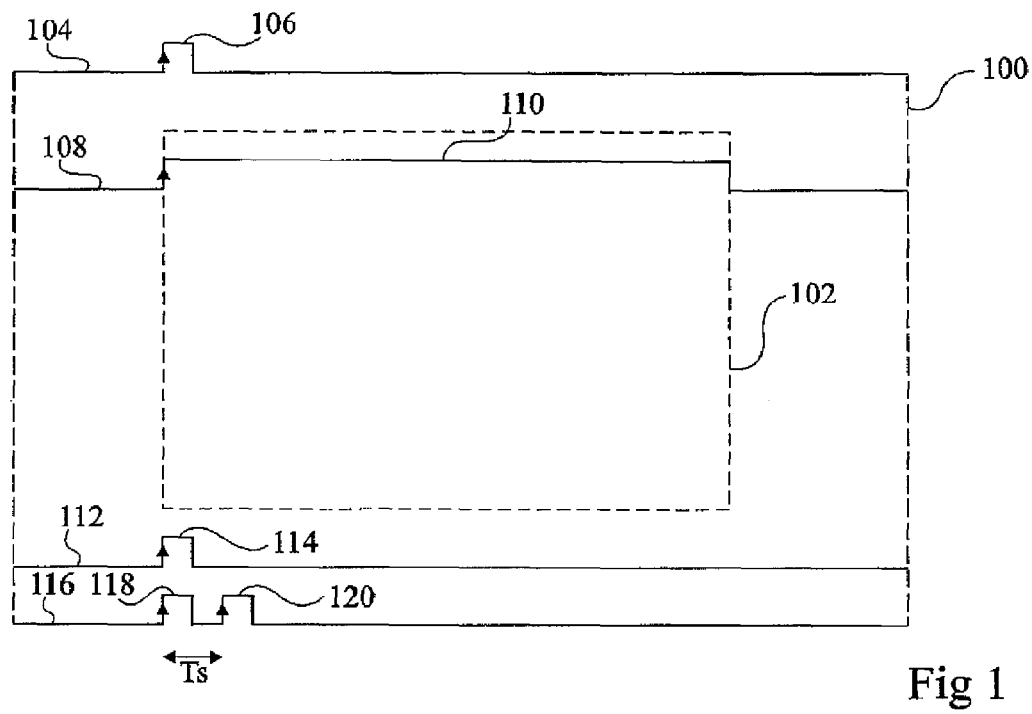
FIG. 1 shows synchronization signals of a video frame according to embodiments of the present invention.

FIG. 1 shows synchronization signals represented with a video frame 100 of a digital video image to indicate the relative timing of pixels of the frame and the synchronization signals. The video frame 100 comprises an active image area 102, in which an image is displayed. The image area 102 for example corresponds to the region displayed on a television display or video camera LCD. Video frame 100 comprises horizontal lines, each line comprising pixels. The pixel data for a frame is generally transmitted and/or displayed in lines from the top to the bottom of the frame, and from left to right in each line. One or more rows at the top and bottom of a frame 100 are for example blank. In practise, the total number of lines in a frame could be for example between 260 and 7000.

Examples of four timing signals associated with four of the lines of the frame 100 are illustrated in FIG. 1.

A timing signal 104 associated with the first (top) line of the frame 100 comprises a pulse 106, which has a rising edge aligned horizontally with the start of the image area 102. As the first line is blank, pulse 106 is a short pulse. Pulse 106 is a vertical synchronization pulse indicating the first line of the frame 100, as well as horizontal alignment of the image area.

A timing signal 108 is associated with a line that passes through the image area 102. Timing signal 108 comprises a pulse 110, which is high for the duration of the image area 102, having a rising edge at the start and a falling edge at the end of the image area 102. Pulse 110 is a horizontal synchronization pulse indicating horizontal alignment of the image area.

A timing signal 112 is associated with a blank line of the image towards the bottom of the frame, outside the image area 102, and comprises a short horizontal synchronization pulse 114 having a rising edge horizontally aligned with the start of the image area 102.

A timing signal 116 is associated with the last (bottom) line of the frame 100, which is also blank, and comprises a pair of short pulses 118 and 120. Pulse 118 is a horizontal synchronization pulse, and has a rising edge horizontally aligned with the start of the image area 102. Pulse 120 is a reference pulse having a rising edge at a determined delay $T_S$ after the rising edge of pulse 118. Reference pulse 120 occurs soon after pulse 118 and is therefore not confused with a horizontal or vertical pulse, and indicates that the next pulse of the synchronization signal is a vertical synchronization pulse at the start of the next frame.

Figure 2:
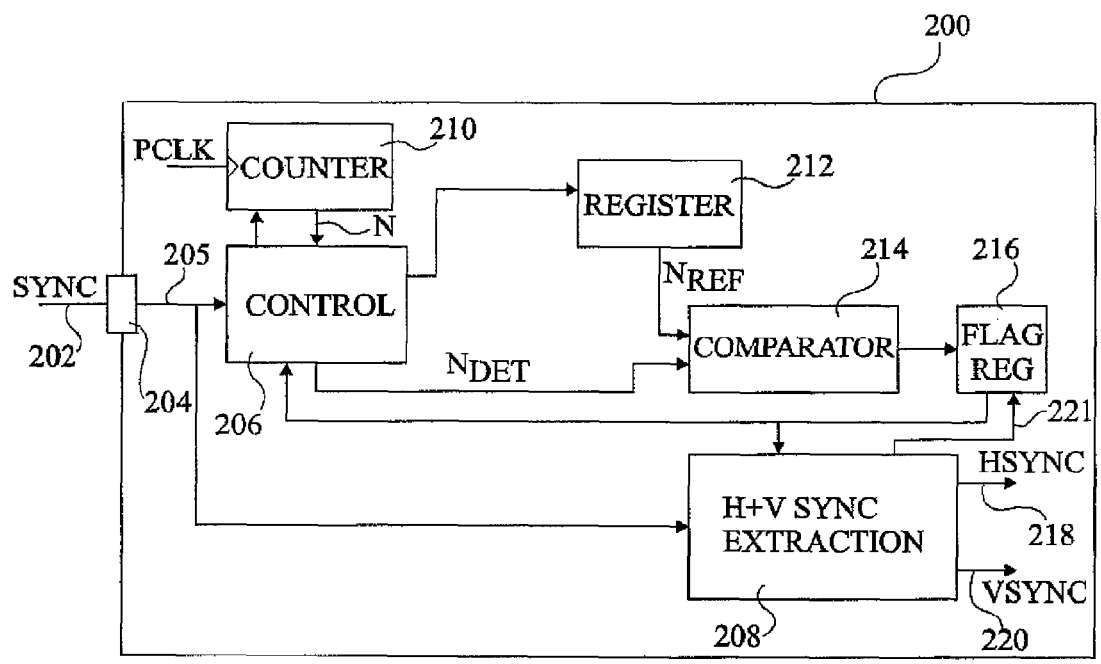
FIG. 2 illustrates receive circuitry according to an embodiment of the present invention.

FIG. 2 illustrates receive circuitry 200 for receiving a synchronization signal SYNC encoded according to the format described above in relation to FIG. 1.

Receive circuitry 200 comprises an input line 202, which receives the synchronization signal SYNC. Line 202 is coupled to an input module 204, which for example comprises an input buffer and/or other circuitry for detecting the signal on line 202 and providing a clean digital signal. The output line 205 of input module 204 is coupled to a control block 206, and a horizontal and vertical synchronization extraction block 208. The control block 206 in turn has respective outputs coupled to a counter 210, which is clocked by a pixel clock PCLK, a register 212 and a comparator 214.

Comparator 214 compares a count value $N_{DET}$ from control block 206 with a reference count value $N_{REF}$ from register 212 and provides the result to a flag register 216. The flag register 216 has its output coupled to the extraction block 208, and to the control block 206.

Extraction block 208 provides, on output lines 218 and 220 respectively, horizontal and vertical synchronization signals HSYNC and VSYNC extracted from the synchronization signal SYNC. Extraction block 208 also has an output line 221 for resetting the flag register 216.

Operation of the receive circuitry 200 will now be described with reference to FIG. 3.

Figure 3:
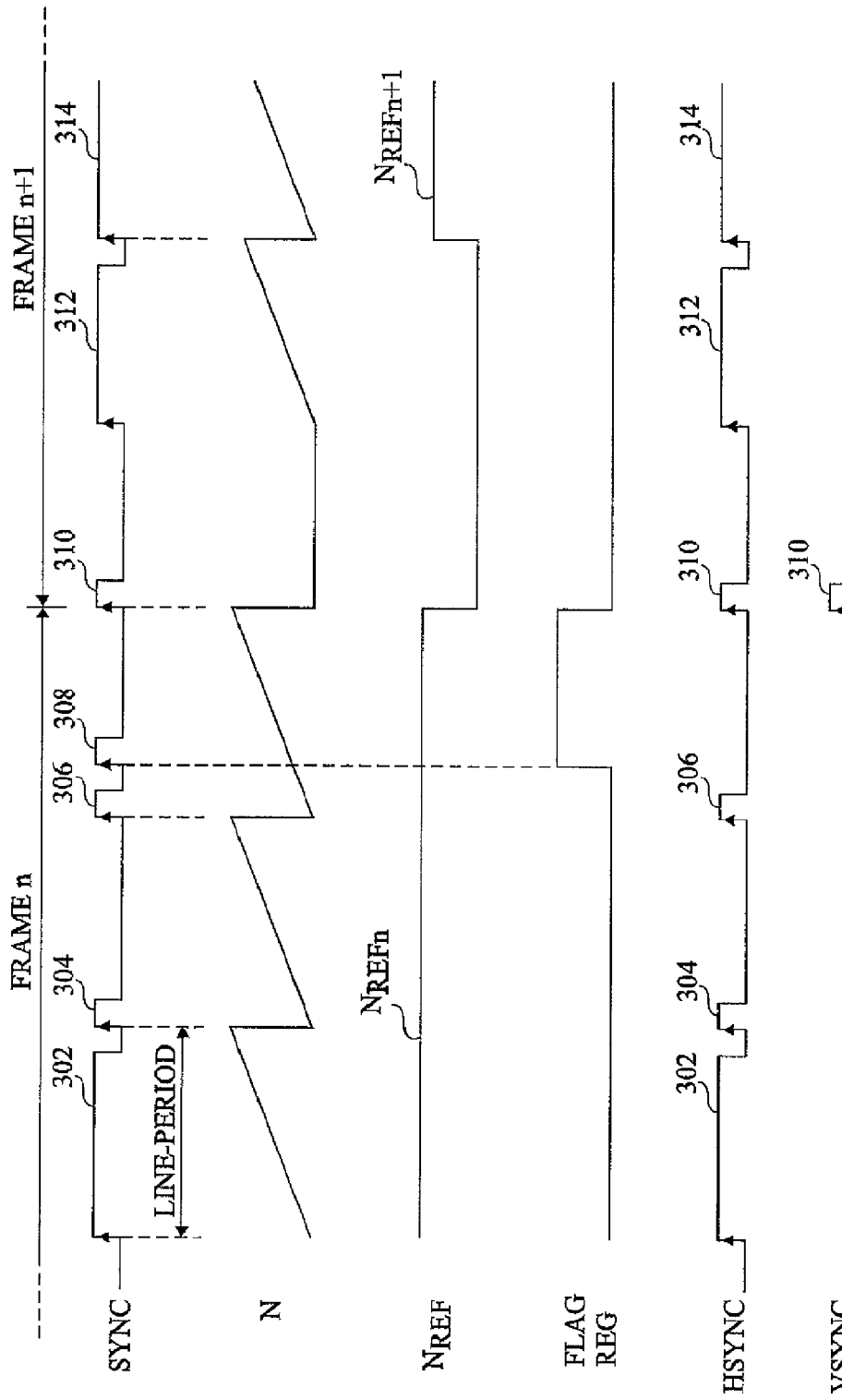
FIG. 3 shows a series of timing diagrams representing signals of the receive circuitry of FIG. 2 according to embodiments of the present invention.

FIG. 3 shows timing diagrams for the synchronization signal SYNC on line 205, the output N of counter 210, the value $N_{REF}$, the value stored by the flag register 216, and signals HSYNC and VSYNC.

In the example of FIG. 3, the synchronization signal SYNC comprises, for a frame n, a long pulse 302 having a duration corresponding to image data in a line, followed by a short pulses 304 and 306 each corresponding to blank lines, pulse 306 corresponding to the last line of the frame n. Pulse 306 is followed shortly thereafter by a reference pulse 308. The synchronization signal SYNC for the next frame n+1 comprises a short pulse 310, followed by long pulses 312 and 314 each having a duration corresponding to the duration of image data in these lines.

With reference again to the circuit of FIG. 2, the control block 206 detects the rising edges of the synchronization signal SYNC on line 205. Between one rising edge and the next, the counter 210 counts the number of pixels per line, by counting periods of the pixel clock PCLK, and the output N of the counter is shown in FIG. 3. At each rising edge of the SYNC signal, the count value $N_{DET}$ reached by counter 210 is provided by the control block 206 to the comparator 214, which compares $N_{DET}$ with a reference value $N_{REF}$ from register 212. $N_{REF}$ is for example equal to the number of pixel periods in half a line period, and provides a threshold for determining whether a pulse is a reference pulse. If $N_{DET}$ is higher than $N_{REF}$, the last pulse received is determined to be a normal horizontal synchronization pulse. In this case, the output of comparator 214 is low, and thus a "0" bit is stored in flag register 216. As shown in FIG. 3, the time delay between the rising edges of pulses 302 and 304, and between the rising edges of pulses 304 and 306, are each greater than half a line period, and therefore the flag register value stays low during reception of these pulses.

However, if $N_{DET}$ is lower than $N_{REF}$, the last pulse received is determined to be a reference pulse. In this case, the output of the comparator goes high, and a "1" bit is stored in flag register 216. As shown in FIG. 3, the time delay between the rising edge of pulse 306 and pulse 308 is shorter than half a line period, and thus shortly after the rising edge of pulse 308, the value in the flag register 216 goes high.

While the flag register value is equal to "0", the horizontal and vertical synchronization extraction block 208 generates the horizontal synchronization signal having the same pulses as the SYNC signal on line 205. In particular, as shown in FIG. 3, the HSYNC signal comprises pulses 302 to 306, 312 and 314 of the SYNC signal.

However, when the flag register value is "1", this indicates that the pulse just received is a reference pulse. The reference pulse is discarded by the extraction block 208, and does not form the horizontal or vertical synchronization signal. Thus pulse 308 in FIG. 3 is not present in either the HSYNC or the VSYNC signal.

When the flag register is high, the next pulse received on line 205 is treated by the extraction block 208 as both a horizontal and vertical synchronization pulse. Thus, this pulse is applied on both lines 218 and 220. As shown in FIG. 3, pulse 310 is applied to both the HSYNC and VSYNC signals. The extraction block 208 also resets the flag register to "0".

The reference value $N_{REF}$ is for example updated at the start of every frame. When the flag register is reset to "0", the control block 206 asserts a reset signal to reset the counter 210 until the next rising edge of the SYNC signal on line 205. Thus, as shown in FIG. 3, the count value N stays low for a period of time after the rising edge of pulse 310. On the next rising edge of pulse 312, the counter is reactivated, and then on the subsequent rising edge of pulse 314, rather than being output to the comparator, the count value is used to update the reference count value $N_{REF}$ in register 212. As explained above, $N_{REF}$ is for example set at half the line period, although in alternative embodiments a different value could be used, for example a value in the range of 3 to $N_{LP}-1$, where $N_{LP}$ is the number of pixel periods in a line period. As shown in FIG.

3, the new value of the reference count value $N_{REFn+1}$ is stored in the register 212 shortly after the rising edge of pulse 314.

Figure 4:
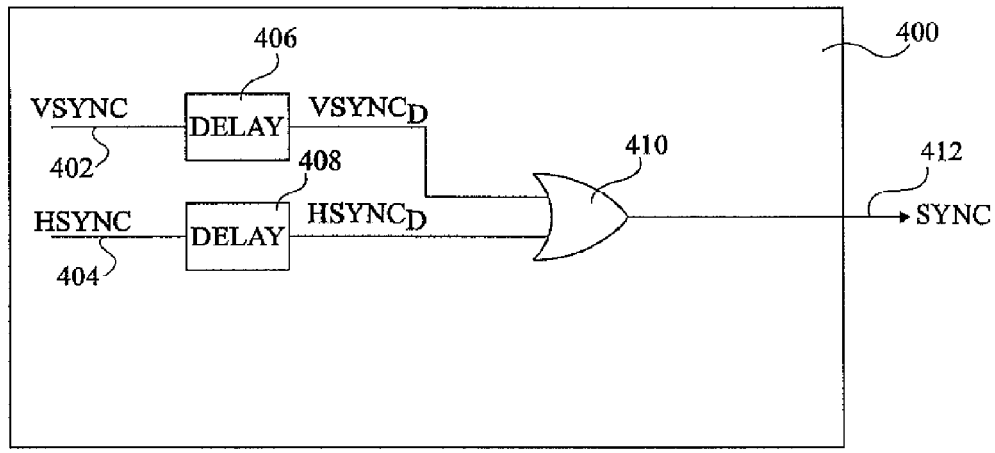
FIG. 4 illustrates generation circuitry according to an embodiment of the present invention.

FIG. 4 illustrates generating circuitry 400 for generating the synchronization signal SYNC.

Generation circuitry 400 comprises a line 402 for receiving the vertical synchronization signal VSYNC and a line 404 for receiving the horizontal synchronization signal HSYNC, these signals being generated by circuitry not shown in FIG. 4. The timing of HSYNC and VSYNC is generally chosen based on the desired format of the video image, for example the size of the frame and the size of the image area.

Lines 402 and 404 are coupled to respective delay blocks 406 and 408. Delay block 406 introduces a delay equal to the time spacing $T_S$ of the reference pulse after the rising edge of the horizontal synchronization pulse, and outputs the delayed vertical synchronization signal $VSYNC_D$. Delay block 408 for example introduces a delay of one line period, and outputs the delayed horizontal synchronization signal $HSYNC_D$. Delay block 408 for example comprises a counter, clocked by the pixel clock, for counting the line periods and applying the detected delay. The signals $VSYNC_D$ and $HSYNC_D$ are provided to respective inputs of an OR gate 410, which combines the $HSYNC_D$ and $VSYNC_D$ signals by applying the OR function and outputs the SYNC signal on an output line 412 of the generation circuitry 400.

Operation of the generation circuitry 400 will now be described with reference to the timing diagrams of FIG. 5.

Figure 5:
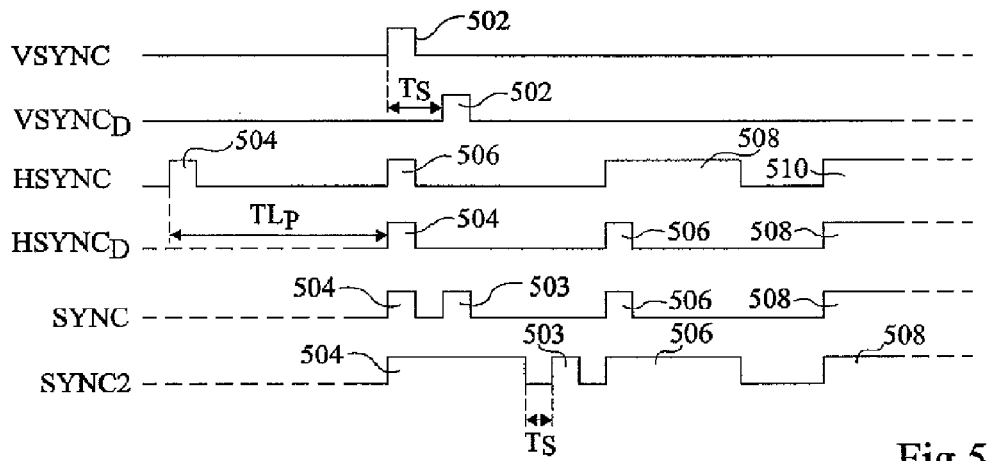
FIG. 5 shows a series of timing diagrams representing signals of the generation circuitry of FIG. 4 according to embodiments of the present invention.

FIG. 5 shows timing diagrams corresponding to signals in the generation circuitry 400 of FIG. 4, in particular, the signals VSYNC, $VSYNC_D$, HSYNC, $HSYNC_D$ and SYNC. A second SYNC signal SYNC2 is also shown as a second example.

The VSYNC signal is shown having a pulse 502, and the HSYNC signal is shown having a series of pulses 504, 506, 508 and 510, pulses 504 and 506 corresponding to blank lines of the video frame and pulses 508 and 510 corresponding to lines traversing the image area. Pulse 506 occurs at the same time as pulse 502. Signal $VSYNC_D$ comprises the pulse 502 delayed by $T_S$. In this example $T_S$ is equal to the delay associated with two pixels. However in alternative embodiments different delays could be used. Signal $HSYNC_D$ is shown comprising pulses 504 to 508, each delayed by the line period $T_{LP}$. The SYNC signal is the combination of $VSYNC_D$ and $HSYNC_D$, where the reference pulse 503 is provided by the delayed VSYNC pulse 502.

In alternative embodiments no delay block 408 for the HSYNC signal is provided, such that the delayed VSYNC pulse 502 is added after the horizontal pulse 506 occurring at the same time as the original pulse 502. This would have the effect of moving a blank line from the start of a frame to the end of the previous frame, which is acceptable in many applications.

The SYNC2 signal illustrates an alternative embodiment in which the time spacing $T_S$ between the horizontal synchronization pulse 504 and the reference pulse 503 is timed from the falling edge of pulse 504 to the rising edge of pulse 503. In this case, the spacing should be less than the normal spacing between a falling edge of a horizontal synchronization pulse and the rising edge of the next horizontal synchronization pulse. As illustrated, this means that if pulse 504 of the HSYNC signal is a long pulse corresponding to a line with image pixels, the reference pulse 503 can be inserted at the end of the long pulse, before the next pulse. The next pulse 506, which is also a long pulse corresponding to a line with image pixels, has a rising edge used for both horizontal and vertical synchronization. The receive circuitry 200 is for example modified to receive this SYNC2 signal, control block 206 controlling counter 210 to count between falling and rising edges of the SYNC signal, and NREF being a threshold between the number of pixel periods corresponding to TS and the usual number of pixel periods between a falling edge of a horizontal synchronization pulse and the rising edge of the next.

Figure 6:
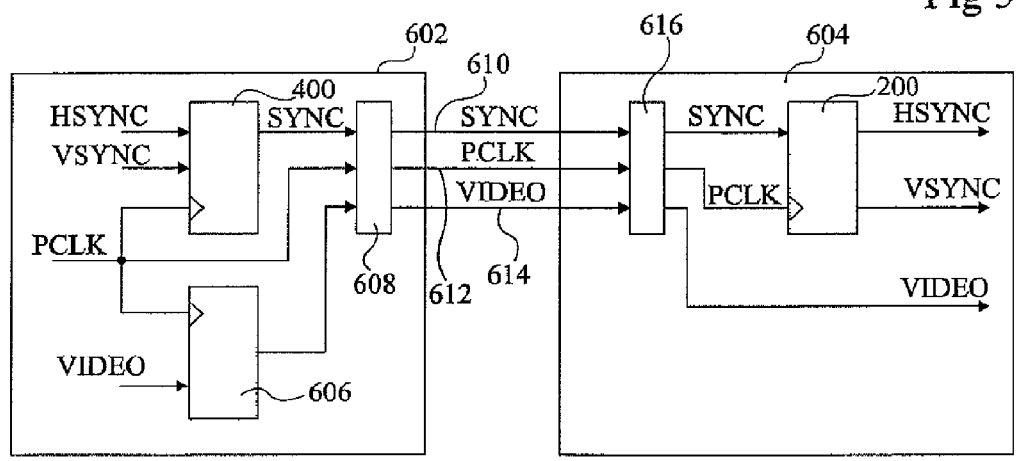
FIG. 6 illustrates a pair of electronic devices according to further embodiments of the present invention.

FIG. 6 shows an electronic device 602, which is for example a digital video camera or other device generating a digital video synchronization signal. As shown, the device comprises the generation circuit 400 described above, which receives HSYNC and VSYNC signals and a pixel clock signal PCLK, and generates a digital SYNC signal on a single line. A block 606 receives a corresponding video stream VIDEO, and for example introduces a delay equal to the delay introduced by circuitry 400. The signals SYNC, PCLK and VIDEO are provided to an output module 608 of device 602. Output module 608 for example comprises output buffers for transmitting these signals to an electronic device 604. These signals may be transmitted directly via a cable, or may be transmitted indirectly, for example via one or more broadcast networks, storage mediums, etc.

Device 604 is for example a digital video camera, which is to be synchronized with respect to device 602. In this case, devices 602 and 604 for example form a stereo-vision system. Alternatively, device 604 could be a set-top box, digital video recorder, display or other device that receives a digital synchronization signal. Device 604 comprises an input module 616 receiving the SYNC, PCLK and VIDEO signals, and provides the SYNC and PCLK signals to the receive circuitry 200 described above, which extracts the HSYNC and VSYNC signals.

In some embodiments, one or both of devices 602, 604 could be part of in vehicle systems. For example, device 604 could be a display mounted in a vehicle for displaying video received from a digital media players such as a DVD or hard disk player, or from a camera also mounted in the vehicle. Device 602 for example could be a camera that is part of a proximity detector in a vehicle, which sends image data to a driver display. Alternatively, device 602 and/or 604 could be used in a safety monitoring system of the vehicle, for example each comprising cameras automatically recognizing road signs or other vehicles in the road ahead.

An advantage of the generation circuitry, receive circuitry, and method of generating and receiving synchronization signals as described herein is that a digital synchronization signal representing both horizontal and vertical synchronization of a video signal may be generated and received on a single line. The digital synchronization signal can be truly digital, comprising just two signal levels. Furthermore, encoding and decoding of the synchronization signal on the single line can be performed in a simple fashion.

Whilst a number of particular examples of the synchronization generation circuitry and the receive circuitry have been provided, it will be apparent to those skilled in the art that there are numerous modifications and alterations that could be applied.

For example, it will be apparent that while the timing signals have been shown in the figures as comprising positive pulses, in alternative embodiments they could comprise negative pulses, in other words the signals could be inverted, and the receive and generation circuitry adapted accordingly.

Furthermore, it will be apparent that while in the embodiments described herein a reference pulse is inserted in the synchronization signal shortly after the horizontal synchronization pulse occurring before the vertical synchronization pulse, in other embodiments it could be inserted after a different horizontal synchronization pulse, including a horizontal synchronization pulse occurring after the vertical synchronization pulse.

Furthermore, while in the embodiments described herein a single reference pulse is described as being used for each vertical synchronization pulse, in alternative embodiments more than one reference pulse could be used.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. Receive circuitry for extracting horizontal and vertical synchronization signals from a digital synchronization signal associated with a video signal, said digital synchronization signal comprising a plurality of pulses, the receive circuitry comprising:
   detection circuitry arranged to determine a first value indicative of the time delay between a timing edge of a first pulse and a timing edge of a second pulse of the digital synchronization signal; and
   a synchronization extraction block arranged to determine that one of the plurality of pulses is a vertical synchronization pulse based on a comparison between the first value and a reference value, wherein said first pulse is a horizontal synchronization pulse corresponding to a blank line of video, said second pulse is a reference pulse, and said one of the plurality of pulses is the next pulse after said second pulse.

2. The receive circuitry of claim 1, wherein the synchronization extraction block is arranged to determine that one of the plurality of pulses is a vertical synchronization pulse if the first value is less than the reference value.

3. The receive circuitry of claim 1, further comprising a register arranged to store said reference value, and a control block arranged to update the reference value based on the determined time delay between a two consecutive pulses, wherein neither of said consecutive pulses is a reference pulse.

4. A display comprising:
   the receive circuitry of claim 1; and
   an input line for receiving said digital synchronization signal.

5. The display of claim 4, wherein the display is adapted to be mounted in a vehicle.

6. A video camera comprising:
   the receive circuitry of claim 1; and
   an input line for receiving said digital synchronization signal.

7. A method for extracting horizontal and vertical synchronization signals from a digital synchronization signal associated with a video signal, said digital synchronization signal comprising a plurality of pulses, the method comprising:
   determining a first value indicating the time spacing between a timing edge of a first pulse and a timing edge of a second pulse of the digital synchronization signal; and
   determining that one of the plurality of pulses is a vertical synchronization pulse based on a comparison between the first value and a reference value, wherein said first pulse is a horizontal synchronization pulse corresponding to a blank line of video, said second pulse is a reference pulse, and said one of the plurality of pulses is the next pulse after said second pulse.

8. The method of claim 7, wherein it is determined that one of the plurality of pulses is a vertical synchronization pulse if the first value is less than the reference value.

9. A receive circuit to extract horizontal and vertical synchronization signals from a digital synchronization signal associated with a video signal, comprising:
   a control circuit configured to determine a time delay between a timing edge of a first pulse and a timing edge of a second pulse in the digital synchronization signal;
   a comparison circuit configured to compare the determined time delay with a reference value; and
   an extraction circuit configured, in response to the comparison circuit determining that the time delay is less than the reference value, to identify the second pulse as a reference pulse, to generate a vertical synchronization signal including a next pulse following the reference pulse in the digital synchronization signal and to generate a horizontal synchronization signal including the digital synchronization signal with the reference pulse removed.

10. A receive circuit as defined in claim 9, further comprising a counter configured to count a pixel clock from the timing edge of the first pulse to the timing edge of the second pulse in the digital synchronization signal, and to provide to the control circuit a count indicative of the time delay.

11. A receive circuit as defined in claim 9, further comprising a reference value register to hold the reference value.

12. A receive circuit as defined in claim 11, wherein the control circuit is configured to set the reference value based on a width of a horizontal synchronization pulse in the digital synchronization signal.

13. A receive circuit as defined in claim 12, wherein the control circuit is configured to set the reference value at one half a line period of the video signal.

14. A receive circuit as defined in claim 9, further comprising a flag register configured to store a result of the comparison performed by the comparison circuit.

15. A method for extracting horizontal and vertical synchronization signals from a digital synchronization signal associated with a video signal, comprising:
   determining, by a control circuit, a time delay between a timing edge of a first pulse and a timing edge of a second pulse in the digital synchronization signal;
   comparing, by a comparison circuit, the determined time delay with a reference value;
   identifying, in response to determining that the time delay is less than the reference value, the second pulse as a reference pulse;
   generating, by an extraction circuit, a vertical synchronization signal including a next pulse following the reference pulse in the digital synchronization signal; and
   generating, by the extraction circuit, a horizontal synchronization signal including the digital synchronization signal with the reference pulse removed.

16. A method as defined in claim 15, further comprising setting the reference value based on a width of a horizontal synchronization pulse in the digital synchronization signal.

17. A method as defined in claim 16, further comprising setting the reference value at one half a line period of the video signal.

18. A method as defined in claim 15, further comprising counting a pixel clock from the timing edge of the first pulse to the timing edge of the second pulse, the count indicating the time delay between the first and second pulses.

* * * * *

UNITED STATES PATENT AND TRADEMARK OFFICE
CERTIFICATE OF CORRECTION

| | |
|---|---|
| PATENT NO. | : 8,203,651 B2 |
| APPLICATION NO. | : 12/266973 |
| DATED | : June 19, 2012 |
| INVENTOR(S) | : Abdelouahid Zakriti |

It is certified that error appears in the above-identified patent and that said Letters Patent is hereby corrected as shown below:

Col. 6, line 33, should read:
received from a digital media player such as a DVD or hard Signed and Sealed this
Thirty-first Day of July, 2012

David J. Kappos
*Director of the United States Patent and Trademark Office*